(12) United States Patent
Gandolfi et al.

(10) Patent No.: US 8,132,528 B2
(45) Date of Patent: Mar. 13, 2012

(54) ROTARY PAN

(75) Inventors: Nicola Gandolfi, Bologna (IT); Roberto Trebbi, Castenaso (IT)

(73) Assignee: I.M.A. Industria Macchine Automatiche S.p.A., Ozzano Emilia (IT)

(*) Notice: Subject to any disclaimer, the term of this patent is extended or adjusted under 35 U.S.C. 154(b) by 579 days.

(21) Appl. No.: 11/910,366

(22) PCT Filed: Apr. 7, 2006

(86) PCT No.: PCT/IB2006/000994
§ 371 (c)(1),
(2), (4) Date: Oct. 1, 2007

(87) PCT Pub. No.: WO2006/109173
PCT Pub. Date: Oct. 19, 2006

(65) Prior Publication Data
US 2008/0264333 A1    Oct. 30, 2008

(30) Foreign Application Priority Data
Apr. 13, 2005 (EP) .................................. 05425211

(51) Int. Cl.
*B05C 3/00* (2006.01)
*B05D 3/12* (2006.01)
*B28C 5/18* (2006.01)
(52) U.S. Cl. ..................... 118/418; 366/57; 427/242
(58) Field of Classification Search .............. 366/324, 366/57; 118/418; 427/242
See application file for complete search history.

(56) References Cited

U.S. PATENT DOCUMENTS

| | | | |
|---|---|---|---|
| 2,978,229 A * | 4/1961 | Jackson | 366/227 |
| 3,601,086 A * | 8/1971 | Hostetler | 118/19 |
| 4,676,187 A * | 6/1987 | Grabowski | 118/19 |
| 4,799,449 A | 1/1989 | Miyata et al. | |
| 4,994,294 A * | 2/1991 | Gould | 426/519 |
| 5,104,232 A * | 4/1992 | Lennox, III | 366/227 |
| 5,507,868 A * | 4/1996 | Takei et al. | 118/19 |
| 5,632,962 A * | 5/1997 | Baker et al. | 422/211 |
| 5,651,613 A * | 7/1997 | Mays et al. | 366/227 |
| 5,669,288 A * | 9/1997 | Zittel et al. | 99/348 |
| 6,824,821 B1 * | 11/2004 | Gillman et al. | 427/212 |

FOREIGN PATENT DOCUMENTS

| | | |
|---|---|---|
| DE | 19525249 A1 | 1/1997 |
| JP | 56-7569 | 6/1979 |
| JP | 54-089205 A | 7/1979 |
| JP | 58-177167 | 10/1983 |
| JP | 60-133838 A | 7/1985 |
| JP | 07-328408 A | 12/1995 |
| JP | 1111407 | 4/1999 |
| JP | 20031088 | 1/2003 |

* cited by examiner

*Primary Examiner* — Dah-Wei Yuan
*Assistant Examiner* — Charles Capozzi
(74) *Attorney, Agent, or Firm* — Pearne & Gordon LLP

(57) ABSTRACT

Described is a rotary pan (1) of the type comprising a central hollow cylindrical body (3) with end portions (4, 4') shaped substantially like truncated cones, and mixing/deflecting means (7) attached to at least one inside surface of the pan (1) itself; the peripheral inside cylindrical surface (5) of the hollow body (3) comprises an extended zone (A) defined by a uniform distribution of through holes (6) and at least one zone (B) within the zone (A) forming an area by which the mixing/deflecting means (7) are attached or fixed to the peripheral surface (5).

3 Claims, 2 Drawing Sheets

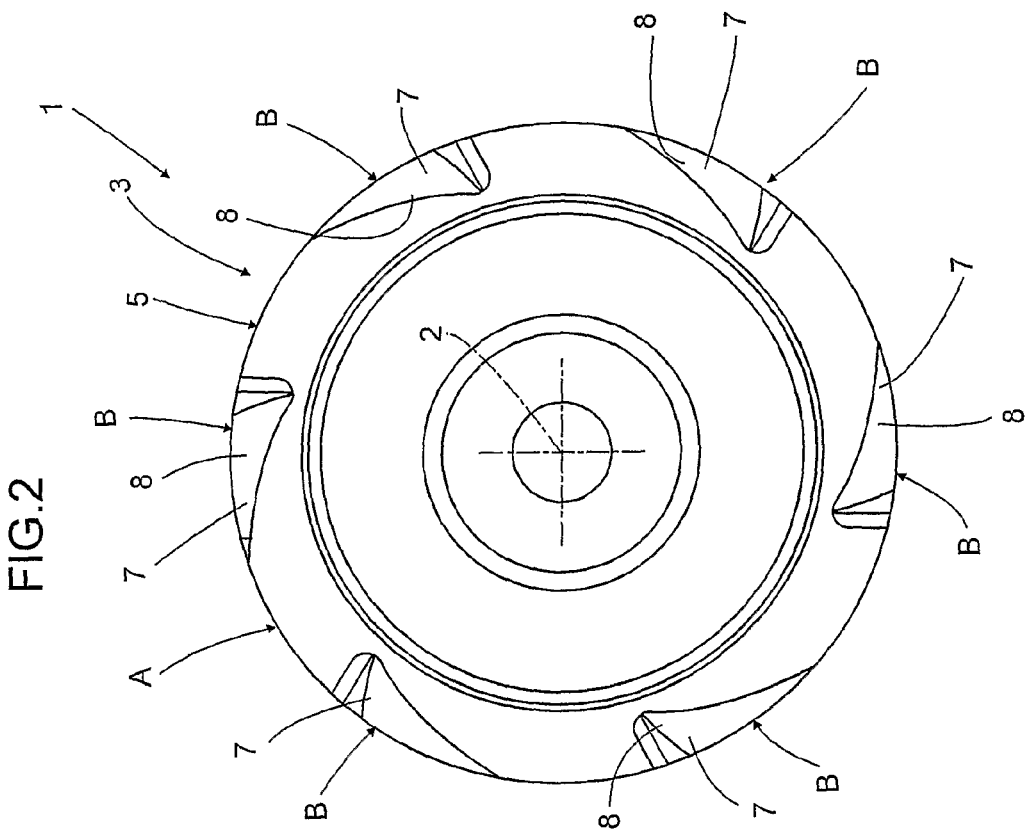
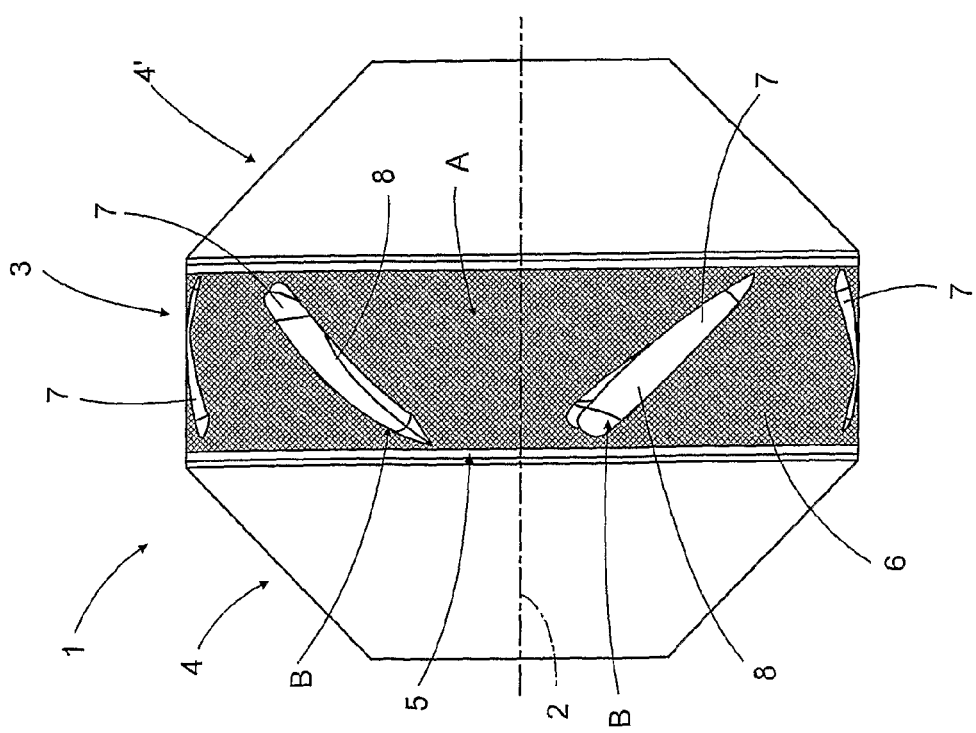

ROTARY PAN

TECHNICAL FIELD

This invention relates to a rotary pan.

In particular, the present invention can be advantageously applied to the field of machinery and equipment for coating pharmaceutical products such as tablets, pastilles and hard gelatin capsules of the type with lid and body which contain pharmaceutical material in powder or liquid form, which the present specification expressly refers to but without restricting the scope of the invention.

BACKGROUND ART

At present, pharmaceutical products are coated with materials of various kinds, for example a liquid substance, using a hollow drum or rotary pan consisting basically of a hollow cylindrical body having end portions shaped substantially like truncated cones. The products to be coated are placed inside the drum and a coating solution is applied to them, for example by spraying.

The drum is rotated continuously so as to mix the products well and a stream or flow of air is circulated inside the drum in order to dry the solution to form the product coating.

At present, drums or pans for coating units can be divided broadly into two types.

In a first type of pan or drum, known in the trade as a Pellegrini pan, the air used for drying purposes is circulated by means of a pair of perforated tubes which are mounted at an angle inside the pan and which, in use, are partly immersed in the mass of products being coated. The inside surfaces of the pan have mixing blades mounted on them to improve the mixing effect while the pan is rotated.

Rotary drums or pans of this kind have been used in product coating devices for some time with excellent results, especially if the speed at which the pan is rotated is not too high.

In the second known type of coating pan, the central body of the hollow pan has a plurality of holes distributed on its cylindrical surface, through which the air used to dry the coating material flows. The deflecting/mixing blades, on the other hand, are located on both the truncated cone portions. Each blade is fixed at one end to the wall of the pan and extends with its other end towards the central cylindrical part.

This solution, however, suffers from a considerable drawback, especially when the pan is rotated at high speeds and that is, that the projecting blades are not able to mix the product very effectively, which means that many of the products are not properly coated and must be rejected.

In addition, the projecting configuration of the deflecting/mixing blades makes it difficult to clean the pan, especially because product fragments tend to accumulate in corners and recesses where the blades are attached to the pan and which are difficult to see and access.

DISCLOSURE OF THE INVENTION

The present invention therefore has for an aim to provide a rotary pan that overcomes the drawbacks of prior art described above.

This invention accordingly provides a rotary pan of the type comprising a central hollow cylindrical body with end portions shaped substantially like truncated cones, and mixing/deflecting means attached to at least one inside surface of the pan itself; the pan being characterised in that the peripheral inside cylindrical surface of the hollow body comprises an extended zone defined by a uniform distribution of through holes and at least one zone within said extended zone forming an area by which the mixing/deflecting means are attached or fixed to the peripheral surface.

BRIEF DESCRIPTION OF THE DRAWINGS

The technical characteristics of the invention are clearly described in the claims below and its advantages are apparent from the detailed description which follows, with reference to the accompanying drawings which illustrate a preferred embodiment of the invention provided merely by way of example without restricting the scope of the inventive concept, and in which:

FIG. 1 is a schematic side view in cross section and with some parts cut away for clarity, of a preferred embodiment of a rotary pan according to the present invention, used in a product coating device;

FIG. 2 is a front view in cross section of the rotary pan of FIG. 1.

DETAILED DESCRIPTION OF THE PREFERRED EMBODIMENTS OF THE INVENTION

Figure 3:
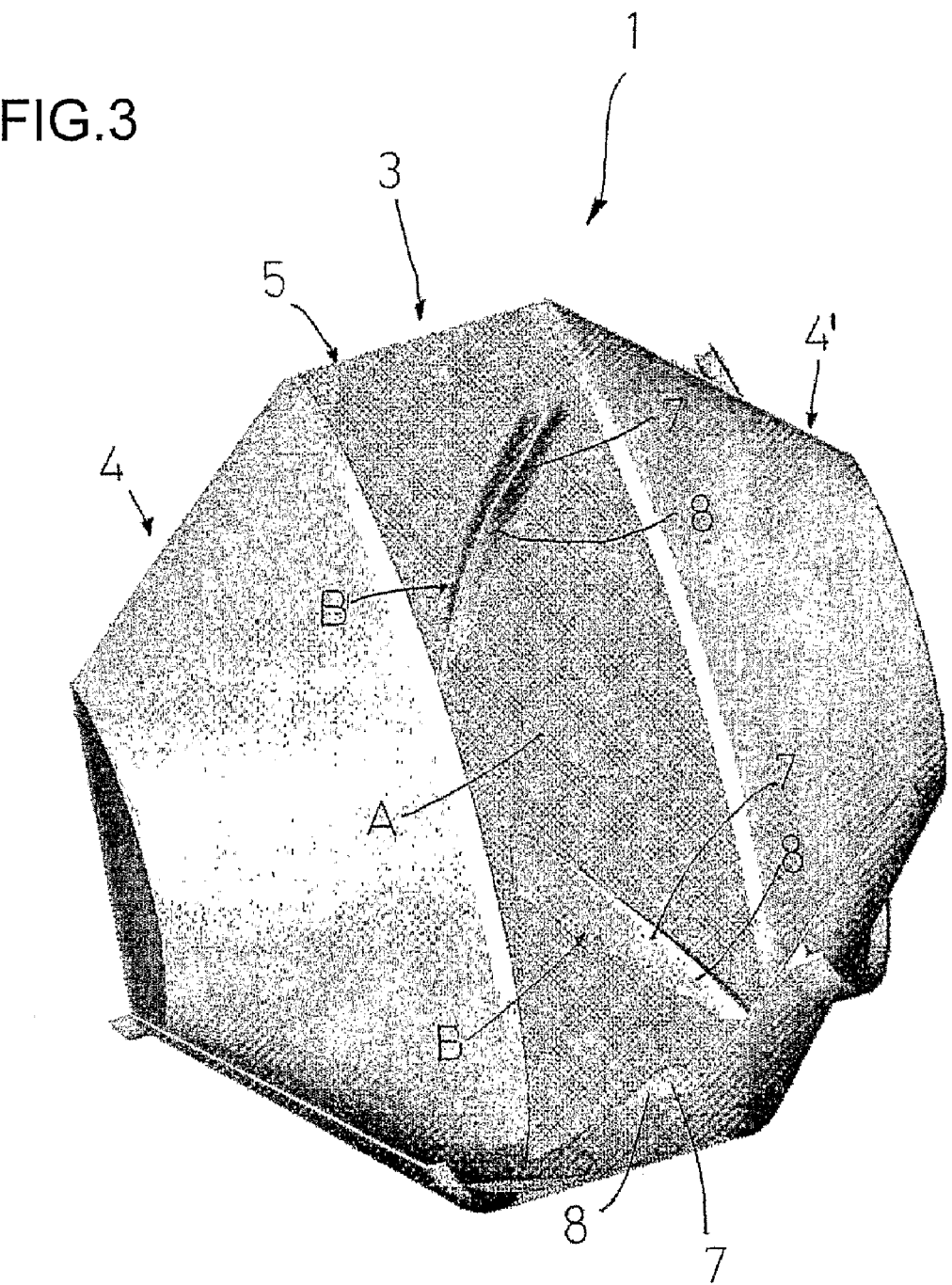
FIG. 3 is a perspective view in cross section of the rotary pan of FIGS. 1 and 2.

With reference to FIGS. 1 and 2, the numeral 1 denotes a hollow drum or pan forming an integral part of a device for coating products, preferably pharmaceutical products with a coating material consisting. for example, of a powder or liquid substance.

The pan 1 is designed to rotate continuously about a horizontal axis of rotation 2 under the action of drive means (known and not illustrated) and consists basically of a central hollow cylindrical body 3 with end portions 4 and 4' shaped substantially like truncated cones (FIGS. 1 and 3). The products to be coated are placed inside the central body 3 and the coating solution is applied to them, for example by spraying.

As better illustrated in FIGS. 1 and 3, the peripheral inside cylindrical surface 5 of the hollow body 3 comprises an extended zone A defined by a uniform distribution of through holes 6 and a distribution of zones B substantially oblong in shape, preferably without holes in them, and variously arranged over the surface 5.

Each oblong zone B within the perforated zone A forms an area by which a mixing/deflecting fin 7 designed to mix the mass of products as the pan 1 rotates about the axis 2, is attached or fixed.

More specifically, each fin 7 is rigidly fixed or connected along its full length to the surface 5, exactly covering a respective zone B, and comprises a substantially helical profile 8, as well illustrated in FIGS. 1 to 3.

A rotary pan 1 of this type offers the following important advantages:

optimum and effective mixing of the product inside the pan 1 even when the pan 1 rotates at high speeds and/or contains large quantities of product, thanks also to the advantageous helical profile 8 of the fins 7 themselves;

ease of cleaning/washing the inside of the pan 1 during maintenance and/or when changing over to a different product, especially in the areas where the mixing/deflecting fins 7 are attached to the cylindrical surface 5 of the central body 3, thus preventing product fragments from accumulating.

The invention described can be modified and adapted in several ways without thereby departing from the scope of the inventive concept. Moreover, all the technical details of the invention may be substituted by technically equivalent elements.

The invention claimed is:

1. A rotary pan comprising a central hollow cylindrical body with end portions shaped like truncated cones, and mixing/deflecting means attached to at least one inside surface of the pan; the pan being rotatable about a horizontal axis of rotation which runs through the center of the cylindrical body, the pan being adapted to and effective to apply a coating to a plurality of products being tumbled inside the pan when the pan is rotated about the horizontal axis of rotation, a peripheral inside cylindrical surface of the central hollow cylindrical body comprising an extended zone defined by a uniform distribution of through holes, said extended zone including at least one zone within the extended zone without holes in it and forming an area at which the mixing/deflecting means is attached or fixed to the peripheral inside cylindrical surface so that, when the pan is rotated, the mixing/deflecting means effectively deflects tumbling product away from the inside cylindrical surface and closer to the horizontal axis, and the mixing/deflecting means comprising at least two separate and distinct fins, each fin being rigidly fixed or connected along its full length and exactly covering a respective zone without holes, said two fins being discontinuous wherein discontinuous means not touching each other.

2. The rotary pan according to claim 1, wherein the at least one zone has a substantially oblong shape.

3. The rotary pan according to claim 1, wherein each fin comprises a helical profile.

* * * * *